United States Patent [19]

Sheng

[11] Patent Number: 4,743,178
[45] Date of Patent: May 10, 1988

[54] NON-LINEAR ELECTROMAGNETIC VIBRATION FLUID COMPRESSION DEVICE

[76] Inventor: Cao P. Sheng, 33/5 Jiao Tong Rd., Shanghai, China

[21] Appl. No.: 838,853

[22] Filed: Mar. 12, 1986

[30] Foreign Application Priority Data

Apr. 1, 1985 [CN] China ................................ 85102855

[51] Int. Cl.$^4$ ............................................ F04B 17/04
[52] U.S. Cl. .................................... 417/410; 417/416; 310/22; 310/29; 310/30; 310/33
[58] Field of Search ...................... 310/15, 27, 28, 29, 310/30, 33, 22; 417/410, 415, 416

[56] References Cited

U.S. PATENT DOCUMENTS

| 1,556,059 | 10/1925 | Williams | 417/416 |
| 2,180,189 | 11/1939 | Alvord | 310/29 X |
| 2,721,453 | 10/1955 | Reutter | 417/254 |
| 2,722,891 | 11/1955 | Weinfurt | 417/416 |
| 4,002,935 | 1/1977 | Brauer | 417/416 X |

FOREIGN PATENT DOCUMENTS

| 821000 | 11/1951 | Fed. Rep. of Germany . |
| 902641 | 1/1954 | Fed. Rep. of Germany . |
| 2310955 | 10/1973 | Fed. Rep. of Germany . |
| 2950831 | 12/1979 | Fed. Rep. of Germany . |
| 57-16279 | 1/1982 | Japan | 417/416 |
| 165160 | 8/1959 | Netherlands | 417/416 |
| 2018523 | 4/1979 | United Kingdom . |
| 2017422 | 4/1979 | United Kingdom . |

Primary Examiner—Carlton R. Croyle
Assistant Examiner—Ted Olds
Attorney, Agent, or Firm—Bradford E. Kile

[57] ABSTRACT

A non-linear, electromagnetic, vibration compression mechanism comprising a non-linear electromagnetic vibration device and a piston-cylinder, plunger-cylinder, or membrane type pump. A reciprocating compression section of the device may be axially arranged at a front or rear portion of the electromagnetic vibration device to form a coaxial compression device. Compression elements may also be installed on the lateral right and left sides or top and bottom of the electromagnetic vibrator to act non-coaxially but in parallel with the vibrator. The electromagnetic vibrator may drive one compression cylinder or several cylinders simultaneously. The reciprocating fluid compression device of the instant invention may be used to compress gas as well as liquid.

18 Claims, 6 Drawing Sheets

NON-LINEAR ELECTROMAGNETIC VIBRATION FLUID COMPRESSION DEVICE

RELATED APPLICATION

This application is related to applicant's copending application Ser. No. 838,985 entitled "Non-Linear Electromagnetic Vibration Device" filed on an even date herewith.

BACKGROUND AND FIELD OF INVENTION

The instant invention relates to a non-linear, electromagnetic vibrating, fluid compression device. It is operative to effect efficient volume changing operations.

Conventional reciprocating fluid compression devices usually employ a rotary motor as a power source and then converts the rotary motion into reciprocating motion using a transmission mechanism. In this sense, its structure is complex and bulky, and its efficiency is generally low. Furthermore, the transmission mechanism can be easily damaged.

If an electromagnetic vibrating device is used as a power source for a reciprocating fluid compressor, direct transmission and resonance may be effected and energy conservation can be relatively enhanced. However, there are usual disadvantages associated with linear type electromagnetic vibration devices, such as small amplitude, unstable vibration characteristics, and limited discharge and working pressure. Therefore, ordinary fluid compression devices using linear electromagnetic vibration devices as a power source unavoidably possess problems in the form of inadequate displacement, working pressure, and lack of efficiency and stability.

Ordinary compressors utilizing electromagnetic vibrators are generally inadequate to achieve sufficient precision of directional vibration. Consequently, cylinders, pistons, or other parts of a working compressor are easily jammed, stuck, or otherwise subjected to non-uniform wear, resulting in unnecessary and extensive damage to the compressor embodying the vibrator. The problem becomes especially pronounced, to a degree hindering normal use, when the electromagnetic vibrator is not coaxially mounted with respect to the compressor cylinder. For this reason, ordinary compressors utilizing an electromagnetic vibrator as a source of power may be properly and effectively operated only in low demand conditions.

In an attempt to alleviate some of these problems, it has been known to employ a multi-stage link in fluid compression devices. However, this modification significantly complicates the structural configuration and achieves relatively little improvement in performance.

Still further, because of the low orientation accuracy in an ordinary electromagnetic vibrator, the vibrator and other components of the compression device are most often arranged coaxially to prevent uneven wear and sticking between cylinders and corresponding pistons. Thus, reciprocating fluid compression devices using an ordinary electromagnetic vibrator as a power source can be used only in certain applications where high performance is not essential.

The difficulties suggested in the preceding are not intended to be exhaustive, but rather are among many which may tend to reduce the effectiveness and satisfaction with prior fluid compression devices. Other noteworthy problems may also exist; however, those presented above should be sufficient to demonstrate that fluid compression devices appearing in the past will admit to worthwhile improvement.

OBJECTS OF THE INVENTION

It is therefore a general object of the invention to provide a novel, non-linear electromagnetic vibration fluid compression device which will obviate or minimize difficulties of the type previously described.

It is a specific object of the invention to provide a fluid compression device embodying a non-linear, electromagnetic vibration, which may be properly and effectively operated in a wide range of variable demand conditions.

It is another object of the invention to provide a fluid compression device embodying a non-linear, electromagnetic vibration and a simple, single stage, link structure.

It is yet another object of the invention to provide a fluid compression device embodying a non-linear, electromagnetic vibration with a high level of precision in directional vibration.

It is yet still another object of the invention to provide a fluid compression device embodying a non-linear, electromagnetic vibration, with a highly efficient and stable operation.

It is a further object of the invention to provide a fluid compression device embodying a non-linear electromagnetic vibration capable of high amplitude vibrations during compressor operations.

It is yet a further object of the invention to provide a fluid compression device which is essentially frictionless in operation.

It is a related object of the invention to provide a fluid compression device which is low in maintenance and capable of being sealed within a container for extended operation.

It is still a further object of the invention to effect any combination of the foregoing objects.

BRIEF SUMMARY OF A PREFERRED EMBODIMENT

The invention as disclosed presents a reciprocating fluid compression device including as the power source a novel, non-linear, electromagnetic vibration devices invented by the applicant herein and the structure of which is disclosed in detail in a separate patent application. The vibrator has high efficiency, stability, orientation accuracy, and large amplitude, and has many adaptive forms suitable for compression devices of different requirements.

The non-linear, electromagnetic vibration device employed in a preferred embodiment of the instant reciprocating, fluid compression device includes an electromagnet, a frame, a linking block, and at least one segmented, corrugated leaf spring set. The center of each corrugated leaf spring is connected to an armature of the electromagnet through the linking block. The two ends, of each corrugated leaf spring, are connected to the core of the electromagnet through the frame. An air gap is selectively maintained between the core and armature of the electromagnet. Two corrugated leaf spring sets may be mounted respectively at opposing ends of the vibrator, or the vibrator may include only one corrugated leaf spring set with that set being mounted at one end of the vibration device. When a pulsating vibration-exciting current is set up in the coil of the electromagnet, the core and armature of the electromagnet, together with the corrugated leaf spring sets, drive a main vibrating part and a relative vibrating part, via electromagnetic force and non-linear elastic restoring force, to vibrate in a non-linear manner at a frequency corresponding to that of an exciting frequency.

The instant fluid compression device, according to a preferred embodiment, employs a simple single stage link structure connecting the armature of the non-linear, electromagnetic vibration device to the piston of at least one corresponding reciprocating compression cylinder. The vibration device has portions thereof fixedly connected to said at least one corresponding reciprocating compression cylinder. Each piston of a respective compression cylinder is coupled to the electromagnetic armature through an associated single stage link member and a support block to which an end of the electromagnetic armature is fixed.

In one embodiment a reciprocating compression cylinder can be fixedly linked to the front or rear side of the nonlinear electromagnetic vibrator in a coaxial manner. Two or more reciprocating compression cylinders can also be fixedly linked concurrently to both right and left sides or the top and bottom, or other portions of the non-linear electromagnetic vibration device in a non-coaxial manner therewith. The overall combination is operative as a fluid compressor suitable for use in various refrigeration or other pump-type applications.

DETAILED DESCRIPTON

Terminology

Prior to providing a detailed description of various preferred embodiments of the invention it may be worthwhile to briefly establish operative terminology in connection with the subject non-linear electromagnetic device.

In the instant invention the drive for the compressor comprises an electromagnetic oscillation installation which may be regarded as a bipolar oscillating system. The core of the electromagnet and other structures fixedly connected thereto in combination constitutes a first vibrating part of a given mass M1. On the other hand, the armature of the electromagnet and other structures fixedly connected thereto in combination constitutes a second vibrating part of a given mass M2. During oscillation, these two oscillating parts make reciprocating motion relative to their respective static positions prior to such oscillations. The corresponding amplitudes of oscillation of these vibrating parts are inversely proportional to the associated given mass as given by the equation $A1/A2 = M2/M1$ wherein A1 and A2 represent respective amplitudes and M1 and M2 represents respective masses of the vibrating parts. Of these two vibrating parts, the one of comparatively smaller total mass has comparitively larger amplitude, and is referenced herein as the main oscillating or main vibrating part. The other vibrating part of larger mass and smaller oscillation amplitude is referenced herein as the relative oscillating or relative vibrating part. The total amplitude of the bipolar system, A, is the sum of the main vibrating part and the relative vibrating part amplitudes, $A1 + A2$. If the mass ratio M2/M1 is greater than ten (10), that is A1 is 10 times A2, then the whole electromagnetic oscillating system can be regarded as a single proton oscillating system. In this event, the total amplitude value A may be regarded as being approximately equal to A1. Similarly, it is possible to adjust the amplitude ratios of the two vibrating parts by adjusting in their respective mass. Accordingly, depending on the manner of connection of various system components to the electromagnet core or to the electromagnet armature, main and relative vibrating parts of various different mass, configuration, and oscillation amplitude may be formed.

Structure and Operation

Figure 1:
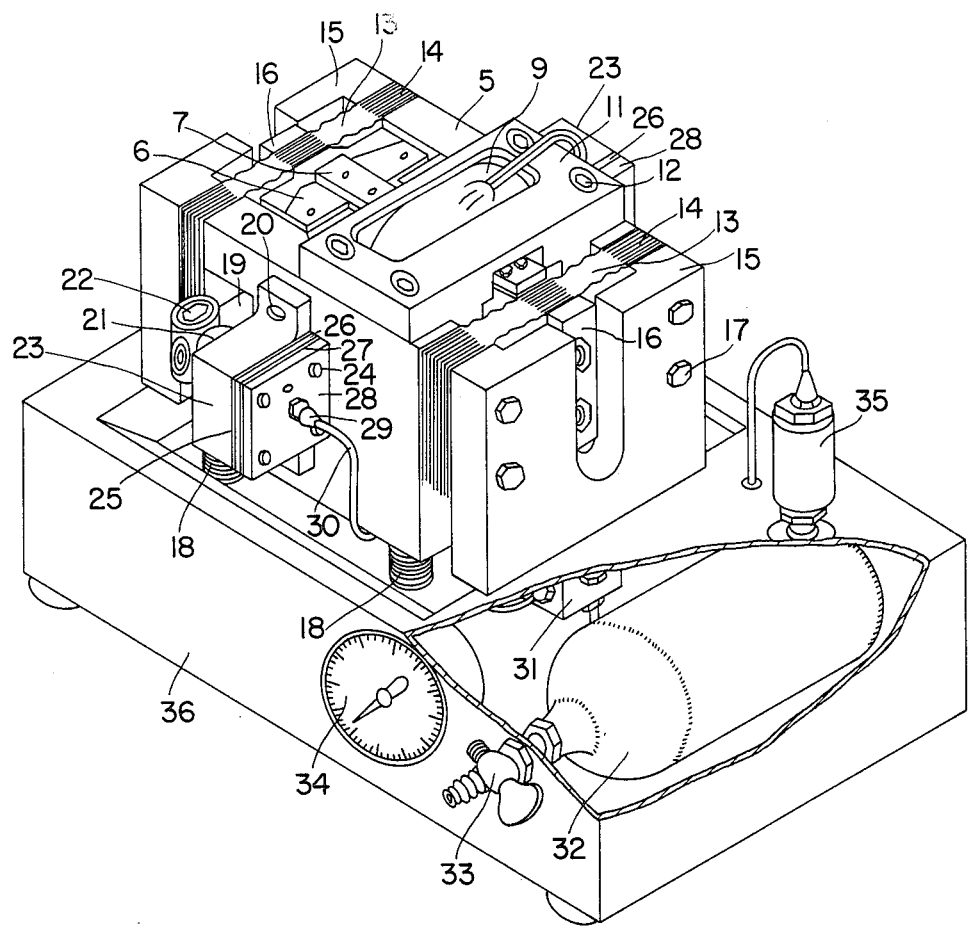
FIG. 1 illustrates an axonometric view of a nonaxially arranged dual cylinder, reciprocating fluid compression device, according to a preferred embodiment of the instant invention.
Figure 2:
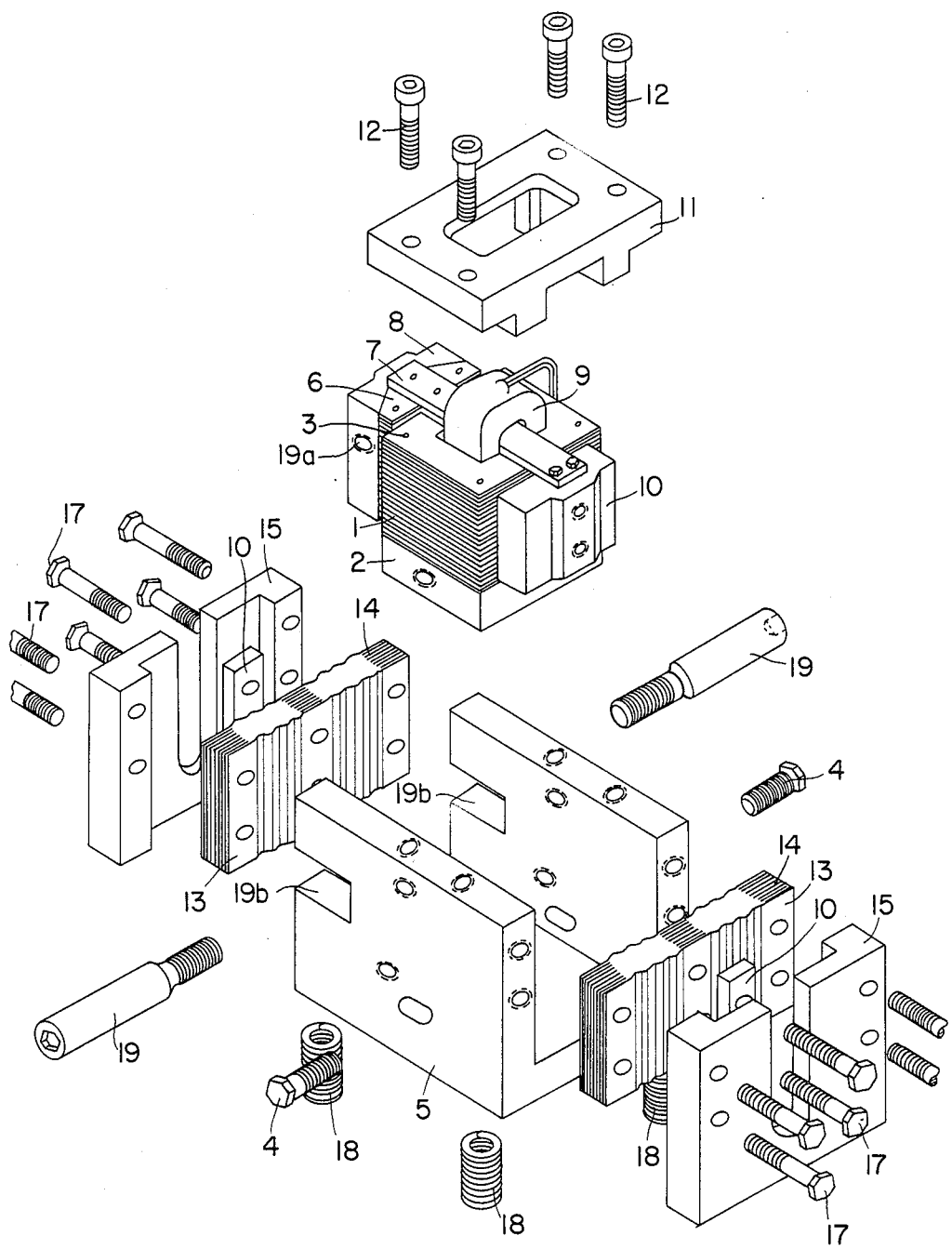
FIG. 2 illustrates an exploded view of a non-linear, electromagnetic vibration device for use in a reciprocating fluid compression device, shown in FIG. 1, according to a preferred embodiment of the instant invention.
Figure 3:
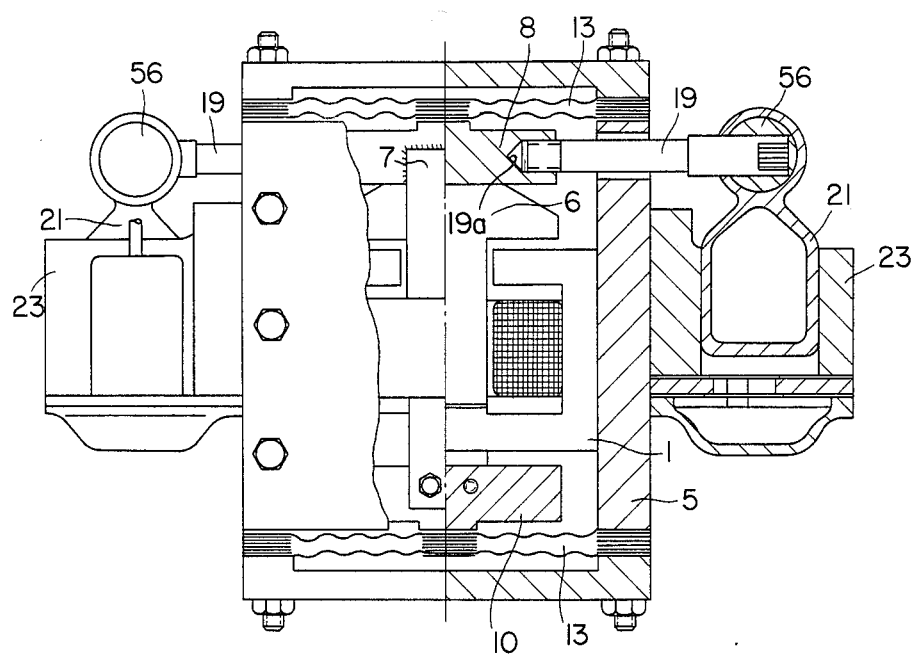
FIG. 3 is a partially cross-sectioned view of fluid compression piston and cylinder assemblies mounted upon opposing sides of a non-linear, electromagnetic vibration device as shown in FIG. 1.

Referring now to the drawings wherein like numerals indicate like parts, FIGS. 1–3 show a preferred embodiment of the instant invention, comprising a compressor unit employing a single stage link structure for connection to respective reciprocating piston-cylinder units, and a nonlinear, bellows spring plate, electromagnetic vibration device as a source of vibration for the compressor.

In reference to FIGS. 1 and 2, the non-linear electromagnetic vibrator comprises an electromagnet frame 5, waveform plate spring sets 13, and armature link blocks 8 and 10. The central structure 1 includes an electromagnet. The electromagnetic armature 6 is fixedly coupled at its opposing ends to armature link blocks 8 and 10 which are in turn connected to a central portion of a respective sectionalized waveform plate spring set 13 in-between two sections of each plate spring in the corresponding spring set. Portions of the frame 5 are fixedly connected to the opposing ends of each sectionalized waveform plate spring set. When the vibrator is in operation, the armature 6 oscillates in a direction generally perpendicular to the primary disposition of the sectionalized waveform plate spring sets.

A dual-piston-cylinder type non-linear electromagnetic vibrating, air compressor is shown in FIG. 1. The power source of the said air compressor is a non-linear, bellows spring, electromagnetic vibration device separately illustrated in FIG. 2 in which an electromagnetic core 1 of the electromagnet is riveted to a base 2 by means of rivets 3 to form a single unit. The electromagnetic core connected to a generally U-shaped frame 5 by means of a screw 4 on each side of the frame.

An armature 6 of the electromagnet is riveted to upper and low linking plates 7 and is connected to a front linking block 8 by means of welding or the like. An electromagnetic coil 9 is placed in the core assembly of the electromagnet and the armature assembly is inserted toward a rear linking block 10 after passing through an inner hole of the core 9. An upper cover 11 presses tightly against the electromagnetic core by means of screws 12.

Two sets of sequentially arranged corrugated leaf springs (i.e. bellows or sectionalized waveform plate springs) are placed at the two ends of the frame 5 respectively. Each leaf spring is separated by means of a washer 14. Although only a front and end spring are shown in the drawings, each spring set 13 may comprise a plurality of individual springs separated by the thin spacer washers 14. At the center and two ends of each bellows leaf spring set 13 there are three assembly sections, each plate having two punched assembly holes through each assembly section. A pressing plate 15 is located at the outer side of the two sets of corrugated leaf spring sets 13 and tightly presses the corrugated bellows spring against the frame 5. At the center of each end of the electromagnetic vibrator is pressing strap 16 which tightly presses the central assembly portion of the corrugated bellows springs 13 against a corresponding end block. At each of the two ends of the non-linear electromagnetic vibrator four screws 17 respectively pass through assembly holes at two ends of the pressing plate 15 as well as assembly holes at two ends of the corrugated leaf spring set 13 and screws down into holes at two ends of frame 5. At the center of each end of the electromagnetic vibrator two screws 17 pass through assembly holes of the pressing strap 16 and assembly holes at the central plate of the corrugated leaf spring set 13 and screw down into holes at the center of front linking block 8 and rear linking block 10 forming a non-linear, bellows plate spring, electromagnetic vibration device.

The sectionalized bellows (waveform) plate spring sets are non-linear elastic components. The non-linear characteristics may be conveniently selected and designed to suit different application environments. In the overall vibration assembly, each waveform plate spring of one configuration may be used in combination with waveform plate springs of the same or other kinds to suit the particular requirements of different application environments. These sectionalized plate springs have smooth non-linear characteristics and a wide range of potential behavior in combination to support a correspondingly wide range of desirable flexibility and rigidity. There is very minimal internal damping, and a very long fatigue life. The plate springs provide high precision in directional motion, and high adjustability for self-adapting control. In all these aspect the subject invention manifests optimal performance in comparison with common linear springs, sectionally linear composite springs, and other existing non-linear springs.

The number of waveform plate springs in each spring set 14 be varied and selectively adjusted to vary the vibration frequency responsive to an exciting frequency from a source. If the number of plate springs is raised to equal the square of an integral times the number required for a harmonic response, the vibration frequency may be multiplied a corresponding integral times. Similarly, if the number of plate springs is made to equal the square of an inverse integral times of the number required for a harmonic response, then the vibration frequency can be made to equal an inverse integral times of the exciting frequency. In this manner, frequency conversion and multiplication under harmonic resonance can be achieved via mechanical adjustments of the number of plate springs. The need for a complex electronic frequency converter is completely eliminated. With the subject vibration assembly, the resonance state can be persistently maintained under no load, or varying rated load conditions. The concept is based on the unique characteristic of strong non-linear systems in being able to generate harmonic resonance. The spring-set stiffness may be varied by varying the number of plate springs, and thus can be made to equal the square of an integral or of an inverse integral times the degree of stiffness under harmonic response. The inherent vibration frequency may be raised an integral times or an inverse integral times by combined adjustments in the mass of vibrating parts and the vibration stiffness. Accordingly, the subject vibration assembly is able to achieve harmonic resonance characteristics in mechanical vibration as in non-linear electromagnetic wave vibration. The instant device enables frequency multiplication and frequency conversion of harmonic response to be achieved for resonance type mechanical vibration without requiring an independent electronic frequency converter device.

When the vibration device is activated, an electrical exciting current flows through coil 9 (note FIGS. 2 and 7), pulsed attraction is generated by electromagnetic action. The spring-sets are correspondingly elastically flexed in unison towards a common direction along a linear axis parallel to the longitudinal axis of the upper connecting plate 7. Because the springs are sectionalized, and because opposing ends of each section of each plate spring are couple to different vibrating parts, main and relative, as discussed above, two self-reciprocating parallelograms are formed which share a major side along an axis parallel to the central longitudinal axis of the upper connecting plate 7. Each side wall of frame 5 constitutes the other major side of each parallelogram, and a corresponding section of each plate spring collectively forms every minor side of each of said two parallelograms.

The whole electromagnetic vibration device is separated from other elements of the compressor by means of four isolating springs 18 and forms an independent dualmass vibration system.

Figure 7:
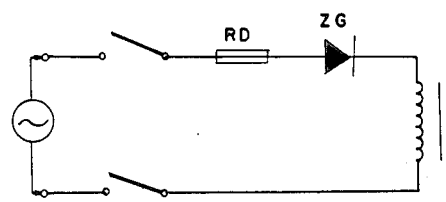
FIG. 7 illustrates an electrical circuit for supplying working frequency current.

When an alternative vibration-exciting current is set up in the electromagnetic coil 9, pulsating electromagnetic force is created between the electromagnetic core 1 and armature 6 and, together with the non-linear elastic restoring force exerted by the non-linear bellows plate spring sets 13, generates forced vibration at a frequency equal to the frequency of the vibration-exciting current produced from a conventional electrical source such as shown schematically in FIG. 7. A main vibrating mass is composed of the armature assembly, front linking block 8 and rear linking block 10. A relative vibrating mass is composed of the electromagnetic core assembly, frame 5, upper cover 11 and front and rear pressing plates 15. When the inherent frequency range is modulated by means of changing the number of springs in the corrugated, bellows plate, spring set 13 so that the electromagnetic vibration is near resonant state at the frequency of the vibrationexciting current. It has been found that a designed amplitude of 6-7 mm can be reached when the exciting frequency is 50 Hz, and non-linear vibration characteristics can be obtained.

In a preferred embodiment of the instant invention a solenoid type electromagnet is utilized. In comparison with a common n or E type electromagnet, the solenoid type has a larger electromagnetic attractive force and travel, and is much easier to connect its two ends to double elastic components, and to carry out position fixing and air gap trimming. In addition, the structure of the entire electromagnetic vibrator is made powerhead-like so that it is easy to connect to and maintain. The core, upper cover and adjoining frame to the core, the armature, and front and rear support blocks of the armature all can be used as the unit for producing the principal vibration. In this manner, the structure can be employed flexibly and mechanical vibration can be sent out conveniently through attachments with simple connecting parts at a number of alternative positions.

A significant breakthrough in the technical field of non-linear vibrating machines made by the present invention lies in the fact that subject springs have been selected to exhibit exponential/sine waveforms. A curve for shifting its standard rigidity is determinable and the parameters for the springs optimal working characteristics are conveniently selectable. This type of non-linear vibration not only depends upon the average rigidity of the vibratory elastic component but has also a close relationship with its rigidity curve and structural damping. The exponential/sine waveform spring adopted in the present invention has smaller structural damping than other springs and the relationship between stress and strain is approximately a logarithmic function.

Let "f" be the stress and "l" the strain. Then $$l = \alpha ln(1 + \beta f),$$

where $\alpha$ and $\beta$ are parameters which can be determined by the method of least square from experimental data. Conversely, "f" can be written as an exponential function of the strain:

$$e^{\frac{l}{\alpha}} = 1 + \beta f$$

$$\therefore f = \frac{1}{\beta}(e^{\frac{l}{\alpha}} - 1).$$

Its rigidity function is found to be $$\frac{df}{dl} = \frac{1}{\alpha\beta} e^{\frac{l}{\alpha}}.$$

Calculations by microcomptuer show that the vibration type non-linear spring with such rigidity function exhibits a stable periodic vibration (under rather extensive external force conditions and for certain amplitudes). The computer has also drawn out its stable limiting rings of the phase space under various parameter conditions.

Even with an elastic vibration component of excellent performance, normal operation of a vibrating machine still cannot be fully ensured with conventional systems. This is because external conditions may vary in differnet ways when the machine is in operation. Thus, for example, when it is used for cutting, the damping in cutting would vary with the change of the hardness and dimension of the work piece being cut; when it is used for conveying and sifting of material, the quantity and variety of the material would entail change in the vibrating mass; and when it is used in compressing gases (vibratory compressor), which is equivalent to attaching a gaseous spring, the change of rigidity curve would arise. The change in these conditions would affect the type of respective vibrations and may cause them to transfer from the near resonance area to the far resonance area and to come out of stable limiting rings and get into a non-stable state, with the result that the vibrating machine either could not operate normally or would exhibit reduced performance during operation.

The present invention has effected three kinds of vibration control, viz:

Damping control (stability control for varying damping);

Rigidity control (stability control for varying rigidity); and

Mass control (stability control for varying mass).

The fundamental principle of control is the method of feedback function, i.e, a preset feedback (self-compensating) function is to be formed by designing electromagnetic, elastic, and mass damping systems. Once the working conditions of a vibrating machine undergoes a change within a certain range, the feedback function would automatically play a role to control and offset the change in external conditions so that the machines may continue to work normally.

The feedback function is implemented by the following procedures:

(a) Procedure of Electromagnetic Feedback

As the amplitude of vibration decreases with the increase of external damping, the velocity of vibration, and, therefore, the resistance of the coil, is reduced, leading to the increase of the current. The result is the increase of the amplitude. This control effect is called electromagnetic feedback, which is particularly manifested as the increase of power with increase of external damping (working damping). To exploit the feedback effect to the utmost, the present invention has made the optimum selection of the gap between the electromagnet and yoke and has used a plug-in yoke so that the maximum feedback effect can be obtained without any collision. The hard spring which the present invention has adopted causes the vibrating body to reduce its velocity abruptly when it reaches the limiting position, which also contributes to the maximum exploitation of this control effect. Moreover, in the design of the coil-rectifier circuit, various forms such as fullwave, full-wave rectification, half-wave rectification, and "full-wave (electromagnet) x full-wave rectification (yoke)" may be employed to meet different working requirements.

(b) Procedure of Preset Stress

In the course of the design, working area, i.e, near resonance, is chosen not only according to the curve of the elastic component, but by matching the selection of parameters the component is made to work outside the working area. Once either the external damping or the mass increases, the elastic component would return from the outside to the inside of the working area. The resonance force inside the working area would assist to compensate for the deterioration of external conditions so that the machines can operate normally.

(c) Procedure of Auxiliary Springs

In the design of vibrating machines, besides the elastic component producing the principal vibration, several sets of auxiliary springs may be installed to meet any possible variation of external conditions. When external changes interfere with the mass and rigidity, these auxiliary springs, would to varying degrees, play a part automatically, resulting in compensatory changes in the rigidity of the vibration system so that the machines can operate normally.

The above control procedures may be used either separately or jointly with one or more of them together. In a specific design, diffrnetial equaltions may be formulated on the basis of test data to be solved by simulation and, if necessary, a computer may be used for optimizing operating conditions.

Bellows (Waveform) Type Plate Springs

Non-linear rectangular bellows type plate spring group is a generally significant operating element of the subject invention by which the main characteristics of the electromagnetic vibration facility and hence, those of the vibration machinery using such facility as its power source are determined.

The main characteristic of this element is the application of thin bellows type plate spring pieces with a generally rectangular outer dimension, and separate segment sine configuration or exponential function and the spaced lamination of such plate springs into a group. Each bellows type plate spring piece has an assembly hole or separate segment assembly plane, so as to use a bolt for fixing and restraining it. Aluminum washer shims may be used between these assembly planes, so that friction may be avoided, when deformation between plate springs is produced The main characteristics of the subject bellows type plate springs may be described in some detail as follows:

(a) Constructed by Thin, Rectangular Plate Spring Piece

A conventional plate spring piece used in electromagnetic vibration machinery is constructed by a thick (2mm) rectangular plate spring piece. There is neither a bellows configuration nor assembly hole on it. The pieces are used in a non-fixed-restraint mode, with the plate spring laminated in a group, and comprising elastic elements with linear elastic characteristic. There were also previously known single-piece, thick, circular plate spring pieces with concentric circle series washer elements, forming a non-linear characteristic or deformation with separate segment linearity to a definite stage and thereafter presenting a non-linear characteristic.

The bellows type plate spring of the subject invention is composed of thin, generally rectangular plate spring pieces.

Each bellows type plate spring piece is generally 0.3–1.5 mm thick. To compare the thin type plate-spring piece with thick type plate-spring piece, we find that the internal damping of the former decreases exponentially, when they are laminated in a group and used. Total damping is still less than that of a comparatively thick type platespring piece with the same rigidity, but the strength of the transverse beam constructed by the former increases with the increase in total area of cross section. In comparing rectangular bellows type springs with disc shape bellows type springs or with rectangular plate springs, it is found that the internal damping determined by the construction factor is also much smaller. When a generally rectangular bellow type plate spring is in the state of working deformation, deformation in a rectangular bellows type plate spring through the bending or twisting action on a vertical line of the bellows may be much higher than that of various conventional plate springs (such as rectangular, non-bellows or disk shape, bellows plate springs) and that of rubber springs under the same action force; yet, in the direction of non-working deformation, there is very large mono-directional rigidity. Therefore, when the subject invention is used in a vibration facility, and vibration motion is produced, both large vibration amplitude and high orientation is obtained.

Each generally rectangular plate spring may have a shaped outer dimensions, such as straight, convex or concave.

(b) Vertical Bellows With Sinusoidal Configuration Or Exponential Function

As mentioned above, with generally rectangular bellows type plate spring pieces, the vertical bellows has a unique influence upon reducing the structural internal damping and assuring correctly oriented motion. Furthermore, there are various kinds of cross-sections of the bellows, whatever the overall outer dimension of the plate spring, such as sinusoidal configuration type, exponential function type and other different forms of bellows type cross-section. These kinds of plate spring pieces have excellent longevity in the fatigue type working state, because the deflection curve is very smooth and the rate of variation may approach an infinitesimal value.

(c) Continuous Non-Linearity of the Elastic Characteristic Curve and the Versatile Selectivity of the Curve The elastic working characteristic of the vertical, bellows type spring piece of this invention presents the variation of continuous-non-linearity within the entire scope of working deformation from start to end. Many kinds of conventional non-linear springs, such as a noncylindrical spiral spring and so on, usually enter a region of nonlinear characeristics only after they have been deformed to a specified extent, and some other non-linear springs, such as linear plate springs, non-linear spiral springs and some combinations of such springs constitute a non-linear characteristic curve by exhibiting separate segment linear characteristics. The generally rectangular, bellows plate spring of the subject invention not only has a pronounced, continuous, complete curve of non-linear elastic characteristic, but also may selectively obtain many different kinds of characteristic curves of non-linear elasticity through changing the design parameters of plate-spring, such as its outer shape, thickness, different bellows shape cross-section elastic waveform, depth of each bellow trough and different techniques of heat treatment. A transistor triode can be used as an example to explain the above mentioned situation. Every kind of transistor triode has its own amplification characteristic curve which may be selected according to a technical specification, and therefore, may satisfy different technical requirements of usage and control. Particularly, in the state of different external load fluctuations, if the proper curve of non-linear elasticity character can be designed and selected, then proper non-linear feed-back characteristics can be achieved to maintain the stability of vibration of the entire system.

(d) Fixed Restraint

The generally rectangular, bellows plate-spring group of the subject invention is different from conventional plate-spring groups. It adopts an assembly mode of fixed restraint with assembly holes which differ from that of conventional, single, non-linear springs. In addition, it utilizes a method of spaced lamination in a group for use, so, springs of this invention has both the characteristic of non-linear elasticity as well as versatile and unique modulation characteristics. The total rigidity of the vibration system can be modulated by increasing or reducing the number of pieces of the bellows plate-spring sets, to realize one order harmonic resonance or multiple order harmonic resonances. Under the conditions of resonance, owing to the above-mentioned characteristics of low internal damping and non-linear motion of the spring of the instant invention, it is possible to obtain much larger resonance amplitudes and spontaneous acceleration characteristics than those of previously known linear and non-linear electromagnetic vibration facilities. Therefore, the energy consumption per unit of vibration strength decreases considerably, and a novel harmonic resonance type double frequency variation method is thus formed.

To summarize, non-linear rectangular bellows plate spring group of this invention has main characteristic of fixed restraint in application, such as, separate segment sine configuration type or exponential function type bellows plate spring with thin and rectangular outer shape and laminating in group, therefore, its elasticity characteristic curve has continuous non-linearity and versatile selectivity of characteristic curve. When it is used in electromagnetic vibration facility or various kinds of vibration machinery, if compared with any known linear or non-linear spring, it may obtain the best and the most stable performance characteristics of vibration in many respects, such as: convenience in design, selection and test of characteristics curve of non-linearity, minimum internal damping, large amplitude, large spontaneous acceleration and high precision orientation, one or more than one harmonic resonance, realization of double frequency variation of excited resonance, as well as high strength and long fatigue-resistant duration time.

Solenoid Type Electromagnet

A conventional electromagnetic vibration unit typically uses a shape "E" shape or "H" shape electromagnet. An electromagnetic vibration facility of this invention uses a solenoid type electromagnetic wherein the armature is generally T-shaped and an electromagnetic core is generaly Ushaped which may better concentrate its electromagnetic attraction in the magnetic field. Furthermore, the electromagnet of the instant invention is made to include unique electromagnetic elements. Silicon steel sheet of high silicon content is used to replace that of low silicon content as a basic material of the electromagnet. In this manner, larger electromagnetic attraction forces can be obtained than that of a conventional unit. In addition, dual reciprocation structures of parallelogram shaped cross-section can be easily constructed to include both front and rear sectionalized waveform plate spring sets on opposing sides of the electromagnet so as to assure a high precision fixed direction motion of the vibration system during system operation.

Control and Adjustment

(a) Control and Adjustment of Performance Characteristics of One or More Than One Harmonic Resonance In conventional linear and non-linear electromagnetic vibration facilities, only the form of a base wave resonance can be used for performing resonance control and adjustment.

According to the instant invention, harmonic resonance can be produced by adjusting the total rigidity of the nonlinear spring sets in the vibration facility. Moreover, through an adjustment of the number, size, bellow shape, and heat treatment of the springs, the total rigidity can become the square of an integral fold or square of a fraction of an integral fold of the predeterminable rigidity in harmonic response. A simultaneous adjustment of the vibrating mass and the total rigidity of the vibration system can yield a vibration frequency higher than that in base wave resonance by an integral fold or a fraction of an integral fold. Therefore, harmonic resonance characteristics traditionally achieved via supplemental electrical controllers can be obtained mechanically. In this manner, frequency variation for excited resonance frequency can be realized without adding any frequency variation electrical devices.

By adjusting the number of plate springs in one or more sectionalized waveform plate spring set to equal the square of an integral (n) times a number predeterminably required therein for the vibration device to achieve harmonic response, one can yield an integral (n) times the vibration frequency of the source as the operating vibration frequency of the device. Similarly, by adjusting the number of plate springs in one or more sectionalized waveform plate spring sets to equal the square of an inverse integral (1/n) times a number predeterminably required therein for the vibration device to achieve harmonic response, one can yield an inverse integral (1/n) times the vibration frequency of the source as the operating vibration frequency of the device.

An example of a determination of the number of spring plates is illustrated below:

The number of plates may be obtained by using the following equation $$W(\chi) = \sqrt{\frac{K(\chi)}{m}} \tag{1}$$

Where
$W(\psi)$ is the operating frequency of the system
$\psi$ is the amplitude.
m is the inertia mass in operation.
$K(\psi)$ is the spring characteristic.
Once $K(\psi)$ has been determined, the number of plates can be determined according to this equation.

The wave shape and the plate form are important to the spring characteristic design. The spring design can be solved theoretically as well as experimentally. The spring characteristic depends on the wave shape, the number of waves, the form of the plate and the applied constraint conditions. The spring design must meet the following requirements:

(1) The spring characteristic must comply with the vibration characteristic.

(2) The spring fatigue life must satisfy longterm operating conditions.

As the applications of springs are extensive, springs used on various vibrating machines may be different from each other. Various springs may be designed qualitatively according to the following comments to determine their parameters, then modified by routine experiments.

I. Spring Characteristic

Using the following terminology:

$K(\psi)$ is the spring characteristic
r is the radius of wave shape
S is the plate thickness
b is the plate width
l is the plate length
n is the number of waves The spring characteristics $K(\psi)$ will be
proportional to $S^3$,
proportional to b,
inversely proportional to $l^2$,
inversely proportional to $r^2$ (using an equivalent arc for other curves),
proportional to (1/n), if the spring material has been determined (consider every wave as a spring, then spring with n waves is equivalent to n shorter springs connected in series.

Therefore $$\frac{1}{K} = \frac{1}{K_1} + \frac{1}{K_2} + \frac{1}{K_3} + \ldots + \frac{1}{K_n}$$

II. Selection of Spring Shape

A. Wave Shape: In determining the wave shape of a spring, a matter of main concern is the fabricating method and its fatigue strength. The sinusoidal and exponential reduction curves are superior to others. Research results of large deflection theory indicates that all $n^{th}$-order differentiable curves and combined curves will not cause stress concentrations, thus behave better for shock resistance and fatigue resistance. Other curve shapes can not be used, however, that forementioned curves are better. In cases of large changes of acceleration, the forementioned curves are greatly preferred.

B. The plate form may be tailored to comply with the stress distribution and adjustment of the spring characteristic, provided the directional vibration requirement has been met.

Referring again to the above equation (1), resonance will take place so long as $W(\psi) = n\omega_1$ (where $n = 1, 2, 3 \ldots k$ or $n = 1, \frac{1}{2}, \frac{1}{3} \ldots 1/k$) with the operating frequency of power supply being $\omega_1$, it is so called harmonic resonance, which is a non-linear vibration characteristic.

In application, $W(\psi)$ is selected as required, then $K(\psi)$ can be determined based on the inertia mass "m", where $K(\psi)$ is the general characteristic of the springs required by the system. It is possible to design the spring according to $K(\psi)$, suppose the characteristic of each spring is $R(\psi)$, the $R(\psi) = K(\psi)/n$, where n is the number of the plate springs.

In an air compressor as an example (to be described in detail below) assume the motion equation of the compressor:

$$m\ddot{\psi} + r(\dot{\psi}, \ddot{\psi})^c + K(\psi) = F(t)$$

will satisfy the operating requirements. The compressor cylinder acts as an air-spring $K_1(\psi)$ during the compressing process. Now a spring $K_2(\psi)$ needs to be added in series $K(\psi) = K_1(\psi) + K_2(\psi)$ to meet the operating requirements. Then $K_2(\psi)$ may be determined by the relationship $K_2(\psi) = K(\psi) - K_1(\psi)$. Knowing or selecting the above referenced variables enables the characteristic and the number of springs to be designed as discussed above. Alternatively, given the structural arrangement disclosed herein, one skilled in the art will be able to quickly select a desired number of characteristics of the spring sets by routine experimentation.

(b) Control and Adjustment of the Stability of Performance Characteristics

Conventional linear electromagnetic vibration devices and vibration machinery are very limited in the region of the stability of performance characteristics under the conditions of fluctuating external loads. Accordingly, complicated electrical control mechanisms are frequently required to improve the stability of performance characteristics. Some existing non-linear type electromagnetic vibration devices, such as rubber spring electromagnetic vibration units and the vibration machinery constructed with it, have been slightly improved in performance stability owing to the feedback of non-linearity characteristic curve, but an electrical control mechanism is still needed and it is very difficult to control and adjust the selffeedback.

No matter how external loads are fluctuated in the form of mass variation, rigidity variation or damping variation and so one, an electromagnetic vibration device according to the instant invention using non-linear bellows plate-spring groups, by taking such spring group as power source and adding a non-linear type elasticity control element according to the requirements, may utilize the self-feedback of the non-linear type elastic element to control and adjust the performance characteristics in a comparatively large range by selecting and fitting the proper control spring matching the non-linear elastiity curve according to the scope of external load fluctuations. Therefore, the vibration system can maintain a stable state of resonance within the scope of load fluctuation from start to the end. In this manner, the stable performance characteristics can be obtained without adding any electrical control mechanism.

Turning now to FIGS. 2 and 3, a bore 19a is located at opposing sides of the front armature link block 8. A respective rod link 19 has one end releasably coupled to a corresponding bore 19a in block 8 and extends through a cut-out portion 19b in said frame 5. A mechanical link join 56 is used to couple the rod link 19 to a piston 21 operably received within a compressor cylinder 23. One cylinder is preferably positioned on opposing peripheral areas of the central structure. The rod link 19 operably transfers motion of the vibrator at its vibration frequency to piston motion and thus to corresponding compression strokes per minute. The full amplitude of vibrator vibration corresponds to the range of compression stroke.

Figure 4A:
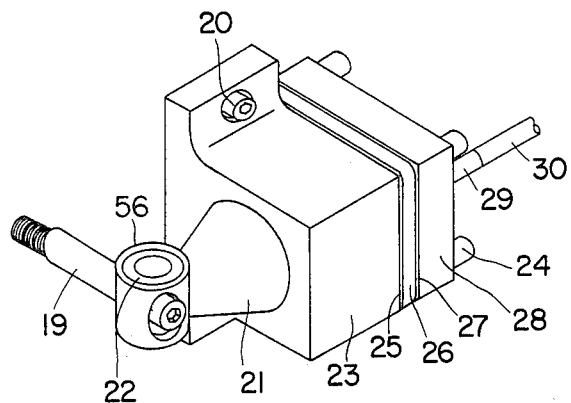
FIG. 4A illustrates an axonometric view of the compressio cylinder component of a reciprocating fluid compression device according to one embodiment of the instant invention.
Figure 4B:
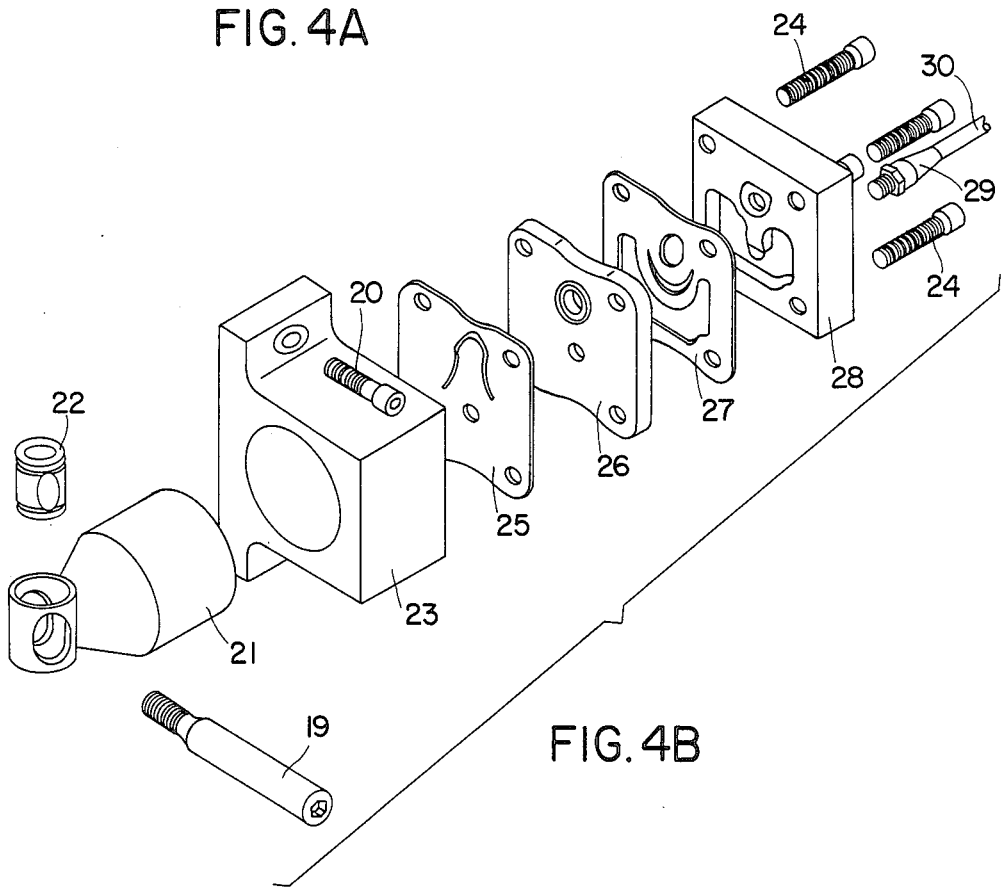
FIG. 4B illustrates an exploded view of a compression cylinder component featured in FIG. 4A.

Referring specifically to FIGS. 4A and 4B a piston 21 is located within each compression cylinder 23. The compression cylinder is fixed via fasteners to a lateral wall of the vibrator frame 5. A similar assembly is preferably arranged for balance on both sides of the vibrator, as shown in FIG. 1, resulting in a compression device having a single vibrator source and balanced dual compression cylinders including respective pistons therein.

Alternative embodiments may be reasonably constructed by one with ordinary skill in the art. For instance, the compressor unit may have only one compression cylinder. A different embodiment may position dual cylinders in front and behind, or on top and below of the vibrator, as opposed to on either side as shown in FIG. 1. In addition, more than two compression cylinders may be efficiently accommodated in a similar manner via the novel structure disclosed. When cylinders are mounted in front and behind of the vibrator, the assembly is of a coaxial configuration. A non-coaxial configuration is represented where cylinders are located laterally or vertically from the axis of vibration of the vibrator.

When the dual balanced compressors are utilized or an axial compressor is featured, a balanced condition exists which is a low friction, low maintenance condition and will admit to use of a sealed enclosure for the vibration assembly.

FIG. 4A illustrates a perspective view of the rod and piston/cylinder assembly as non-coaxially mounted to the electromagnetic vibrator. FIG. 4B is an exploded view of the compressor unit shown in FIG. 4A.

In order to eliminate axial error in assembly, a sliding block 22 is arranged in the connecting head 56 which links the connecting rod 19 and piston 21. Driven by the front linking block 8, piston 21 reciprocates at one end in cylinder block 23 at a frequency and amplitude equal to those of the non-linear, harmonic electromagnetic vibrator. A valve package comprising an inlet valve 25, valve plate 26, outlet valve 27, and cylinder head 28 is mounted on the other end of the cylinder 23 by means of screws 24. During each backward stroke of the piston 21, the inlet valve 25 is opened automatically and air is sucked into cylinder 23 through an inlet hole at an upper center of the cylinder head 28 and inlet pipe. During each compressing stroke of the piston 21, the inlet valve is closed automatically onto the valve plate 26, and outlet valve 27 is opened automatically. Air in cylinder 23 is then compressed by piston 21 and is exhausted out of the compressing cylinder through an exhaust hole. Compressed air travels through an exhaust pipe connector 29 fitted on cylinder head 28, an exhaust pipe 30, a five-way pipe fitting 31, and enters a compressed air container 32. Compressed air may then be accessed, as desired, through an air-supply valve 33.

High exhaust pressure can be obtained by means of adjusting the position of the dead point of the working stroke of the piston 21 to reduce the gap between the piston crown and inlet valve 25 to be sufficiently small by the end of the working stroke of the piston.

The pressure within cylinder 32 can be indicated by a conventional pressure gage 34 connected to the five-way pipe fitting 31. The maximum output pressure the air compressor can reach is approximately 12-20 $kg/cm^2$ when the diameter of the piston 21 is 36 mm. Under a rated working pressure of 6 $kb/cm^2$, the said dual-cylinder compressor can stably produce 0.025 $m^3$ compressed air per minute. The required working pressure range can be adjusted freely by means of a pressure regulator 35 connected to the five-way pipe fitting 31. The starting current of the electromagnetic vibrating air compressor is not higher than the operating current and the said compressor can be started frequently under pressure. In addition, the compressor can always work close to resonant state within the changing range of working pressure.

Figure 5:
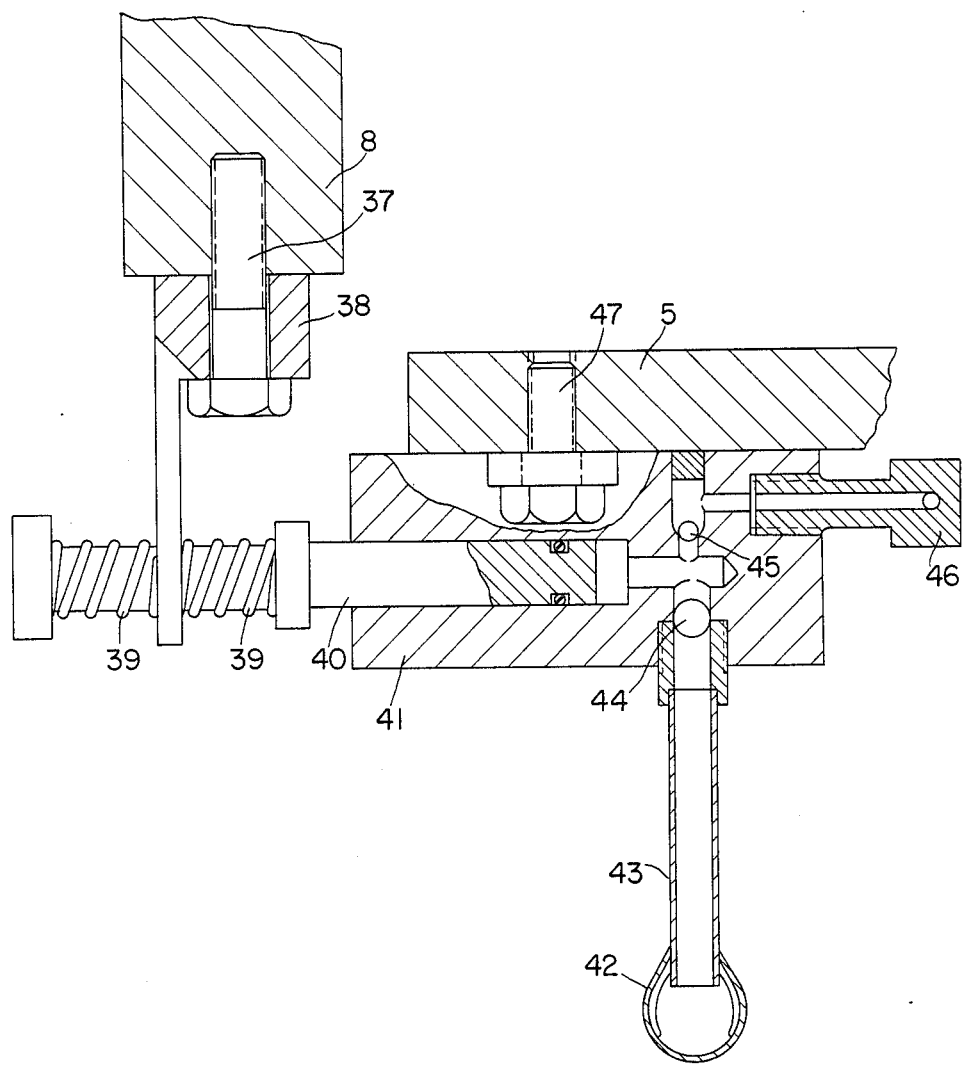
FIG. 5 illustrates a partially cross-sectioned view of a lubricating oil plunger pump for use in the reciprocating fluid compression device according to one embodiment of the instant invention.

The whole electromagnetic vibrating air compressor device is installed on a base 36 by means of four isolating springs 18 (note FIGS. 1 and 2). A certain amount of lubricating oil is contained within the base 36. FIG. 5 illustrates in detail a manner of connection between the electromagnetic vibration device and the base. In this connection a linking plate 38 is fitted under the front linking block 8 of the electromagnetic vibrator by means of a screw 37. A plunger 40 of a plunger pump which is installed on the frame 5 by screw 47 may then be driven against restraining forces of compression springs 39.

The plunger 40 reciprocates in the plunger cylinder block 41 and pumps lubricating oil through a suction pipe 43 with a filter 42 from an oil sump in the base 36 and through one-way valves 44, 45 and an outlet three-way pipe fitting 46 supplies lubricating oil at a required rate to the pistons 21 of the two air compressing cylinders. The lubricating oil returns to the storage sump of the base 36 through pistons 21 and over the oblique plane of the base and can be re-circulated again.

Figure 6:
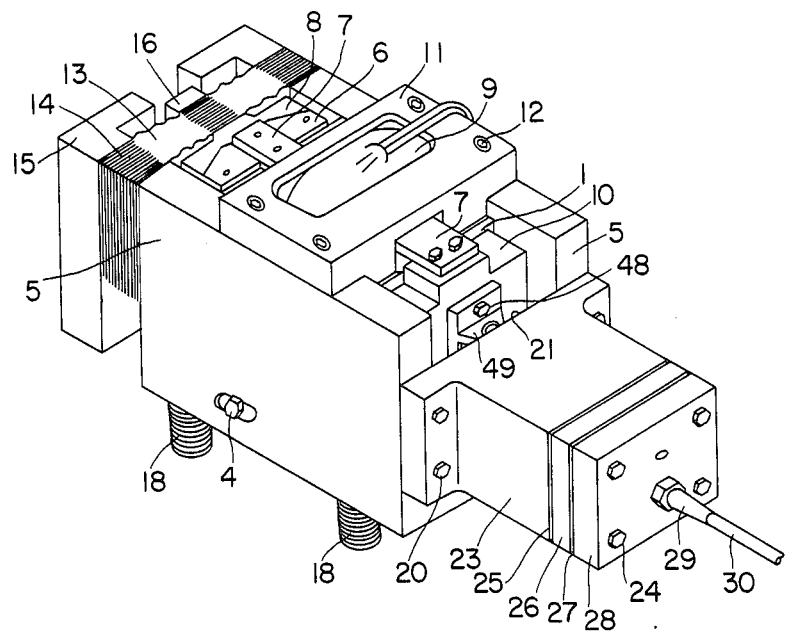
FIG. 6 illustrates a coaxially arranged, single cylinder, non-linear, electromagnetic reciprocating fluid compression device according to an alternate embodiment of the instant invention.

FIG. 6 is an axonometric drawing showing a non-linear vibration power source and a compressing cylinder assembly of a single-cylinder non-linear electromagnetic air compressor whose compressing cylinder assembly and electromagnetic vibrator are arranged coaxially. The basic structure of the compressor is similar to the first embodiment shown in FIGS. 1–5, except that the compression cylinders) are coaxially mounted. In a simplified structure, the two sets of corrugated leaf springs on opposing sides of the vibration assembly are combined into one set and are installed at one end of the electromagnetic vibration device. A compressing cylinder 23 is directly fitted onto the frame 5 at another end of the electromagnetic vibration device, by means of screws 20. A piston 21 of the axial compressor is connected to the main vibrating section through connecting frame 49 which is fitted on the rear linking block 10 by means of screws 48.

Alternatively, the corrugated bellows spring sets need not be combined and relocated, and each compression cylinder may be mounted outside of a corresponding spring set while fixedly connected to the frame 5 via bolts 17 through plate 15 with a piston 21 coupled to elements 10. In this alternative manner, one or more than one compression cylinder may be mounted coaxially to the vibration assembly without rearrangement of a spring set. The air compressing procedure of these coaxial embodiments is similar to that of above described non-coaxial embodiments.

SUMMARY OF THE MAJOR ADVANTAGES

A non-linear electromagnetic vibration device employed in the instant non-linear compression device has a higher range of vibration amplitude than an ordinary vibrator. At certain optimal exciting frequencies, it may achieve a vibration amplitude twice or more times as large as a conventional electromagnetic vibrator. Moreover, the non-linear electromagnetic vibrator exhibits an enhanced degree of working stability. This stability persists even under harsh conditions of drastically varying load, because of a high degree of adaptability characteristic of non-linearity of the vibration device. At the same time, the precision of directional vibration is enhanced because a non-linear electromagnetic vibrator is ordinarily of a parallel quadrangle structure.

Whether a coaxial or non-coaxial configuration is employed, the subject invention includes a novel compressor structure employing a non-linear electromagnetic vibrator and is free of seizure and non-uniform wear problems associated with compressors of the prior art. Furthermore, a simple single stage link structure is employed, which greatly reduces the complexity of the device and expands its range of application utility.

As compared to conventional linear electromagnetic vibrating reciprocating fluid compressing devices, the present device has a simpler structure and can obtain greater working displacement and higher working pressure. In addition the device can always stably work close to a resonant state in a large range of pressure changes—from null working pressure (0 kg/cm$^2$) to a maximum working pressure. The subject device has a stable working current and does not rise when working pressure increases and can frequently start at any time without difficulty under null load or under pressure. The present device has accurate motion orientation and can avoid sticking between piston and cylinder and uneven wear whether it is coaxially or non-coaxially arranged with multicylinders. The present device can save approximately 50% on energy usage as compared with rotary motor powered reciprocating fluid compressing devices having a similar displacement and working pressure.

The present device can be composed of a non-linear electromagnetic vibrator and different kinds of reciprocating compression cylinder assemblies and can be widely used in different application environments including those of a refrigerating compressor, an air compressor, and pumps.

The novel structure of the subject invention produces a larger discharge with a simple configuration. A high working pressure may be achieved. The compression unit can operate steadily and persistently in or near a resonance state despite variations in load pressure. Furthermore, the working current does not rise when the load pressure is increased nor does it fall when the device is in resonance.

ALTERNATIVE EMBODIMENTS

In describing the subject invention, reference has been made to preferred embodiments. Those skilled in the art, however, and familiar with the disclosure of the subject invention, may recognize additions, deletions, substitutions, modifications and/or other changes which will fall within the purview of the invention.

I claim:

1. A non-linear, electromagnetic vibration, fluid compression device comprising:
    a non-linear electromagnetic vibration device having
        a first vibrating part including,
            an electromagnetic armature, and
            an electromagnetic coil mounted about said armature;
        a second vibrating part including,
            a generally U-shaped electromagnetic core mounted about said armature and said coil, a free end portion of said armature extends into said generally U-shaped electromagnetic core to a posture wherein the free end of the armature is adjacent to but spaced from a base portion of said generally U-shaped electromagnetic core;
    means for operably connecting said first vibrating part to said second vibrating part to permit relative motion between said first vibrating part and said second vibrating part;
    said means for operably connecting said first and second vibrating parts including,
        at least a first generally rectangular, nonlinear, bellows plate spring means wherein one portion of said spring means is rigidly affixed to said first vibrating part and another portion of said spring means is rigidly affixed to said second vibrating part; and
        said non-linear, bellows plate spring means comprising a plurality of non-linear, bellows plate springs and each spring being composed of a plurality of mutually parallel waveforms between a central portion rigidly affixed to one of said first and second vibrating parts and edge portions rigidly affixed to the other of said first and second vibrating parts;
    electrical power means connected to said electromagnetic coil for supplying electrical current pulses to said coil and electromagnetically inducing movement of said armature within said core in opposition to a nonlinear restoring spring force of said at least one generally rectangular, non-linear bellows plate spring operably extending between said first vibrating part and said second vibrating part, whereby a resonant, non-linear electromagnetic vibration may be induced between said first vibrating part and said second vibrating part;
    a first reciprocating-type compression cylinder including a piston received therein for reciprocating motion,
        said piston being operably connected to one of said first and second vibrating parts, and
        said cylinder being operably connected to the other of said first and second vibrating parts;
    whereby relative oscillating motion of said first and second vibrating parts induced via action of said non-linear, bellows plate spring means is converted to reciprocating piston motion in said first compression cylinder.

2. A non-liner, electromagnetic vibration, fluid compression device as defined in claim 1 wherein:
    said first portion of said pump comprises a piston; and
    said second portion of said pump comprises a cylinder.

3. A non-linear, electromagnetic vibration, fluid compression device as defined in claim 1 wherein:
    said first reciprocating compression cylinder is mounted with a central axis offset from and parallel with respect to a major axis of said first and second vibrating parts; and
    a first link means is provided for connecting said piston to said one of said first and second vibrating parts.

4. A non-linear, electromagnetic vibration, fluid compression device as defined in claim 1 and further comprising:
    a second reciprocating-type compression cylinder including a piston received therein for reciprocating motion, said piston being operably connected to one of said first and second vibrating parts, and said cylinder being operably connected to the other of said first and second vibrating parts;

whereby oscillating motion of said first and second vibrating parts induced via action of said non-linear bellows plate spring means is also converted to reciprocating piston motion in said second compression cylinder.

5. A non-linear fluid compression device as recited in claim 4 wherein:

said first reciprocating compression cylinder is mounted with a central axis offset from and parallel with respect to a major axis of said first and second vibrating parts;

a first link means is provided for connecting said piston to said one of said first and second vibrating parts;

said second reciprocating compression cylinder is mounted with a central axis offset from and parallel with respect to said major axis of said first and second vibrating parts; and a second link means is provided for connecting said piston to said one of said first and second vibrating parts.

6. A non-linear, electromagnetic vibration, fluid compression device as defined in claim 5 wherein:

said major axis of vibration of said first and second vibrating parts and said axis of piston reciprocation of said first and second reciprocating compression cylinders are arranged in parallel on opposite sides of said first and second vibrating parts.

7. A non-linear, electromagnetic vibration fluid compression device as defined in claim 5 wherein:

each of said first and second linking means includes a support block to which an end of said electromagnetic armature is connected, and a link member fixedly connecting a corresponding piston to said support block; and each of said link members includes a rod having a major axis disposed substantially perpendicular to said major axis of vibration of said first and second vibration device and to a respective axis of said first and second reciprocating compression cylinders.

8. A non-linear, electromagnetic vibration, fluid compression device as defined in claim 1 wherein:

said first reciprocating compression piston and cylinder is coaxially mounted with respect to a major axis of vibration of said first and second vibrating parts.

9. A non-linear, electromagnetic vibration, fluid compression device as defined in claim 1 wherein said second vibrating part further comprises:

a generally U-shaped frame surrounding and receiving said generally U-shaped electromagnetic coil and being releasably connected to the lateral surfaces of said core.

10. A non-linear, electromagnetic vibration, fluid compression device as defined in claim 9 wherein:

said cylinder is securely connected to said U-shaped frame, and said piston is operably connected to said electromagnetic armature.

11. A non-linear, electromagnetic vibration, fluid compression device as defined in claim 10 wherein said first vibrating part further comprises:

a first linking block connected to said electromagnetic armature.

12. A non-linear electromagnetic vibration, fluid compression device as defined in claim 11 wherein:

said armature comprises a generally T-shaped configuration and the length of a leg element of the T-shaped armature is such that the gap between the free end of the leg element of the armature with respect to the base portion of the U-shaped electromagnetic core is equal to a gap that exists between the arm portions of the T-shaped armature and end most leg portions of the U-shaped electromagnetic core.

13. A non-linear electomagnetic vibration, fluid compression device as defined in claim 12 wherein said first vibrating part further includes:

a second linking block connected to said electromagnetic armature and extending adjacent to but spaced from the exterior of said electromagnetic core, said second end unit being in alignment with said first end unit; and means for operably connecting said leg element of said armature to said second end unit.

14. A non-linear, electromagnetic vibration, fluid compression device as defined in claim 13 wherein said at least a first generally rectangular, non-linear, bellows plate spring comprises:

a plurality of generally rectangular, non-linear bellows, plate springs which are stacked together but spaced apart into a mutually parallel array of generally rectangular, non-linear bellows, plate spring sets.

15. A non-linear electromagnetic vibration, fluid compression device as defined in claim 14 and further comprising:

a plurality of generally rectangular, non-linear bellows, plate spring sets extending between said first vibrating part and said second vibrating part.

16. A non-linear electromagnetic vibration, fluid compression device as defined in claim 15, wherein:

the number of plate springs in each said generally rectangular, non-linear bellows plate spring sets equals the square of an integral (n) times of a number predeterminably required therein for the vibration device to achieve harmonic resonance.

17. A non-linear, electromagnetic vibration, fluid compression device as defined in claim 15, wherein:

the number of plate springs in each said generally rectangular, non-linear bellows plate spring sets equals the square of an inverse integral (1/n) times of a number predeterminably required therein for the vibration device to achieve harmonic resonance.

18. A non-linear, electromagnetic vibration, fluid compression device as defined in claim 1 and further comprising:

lubricating fluid pump means connected between said first vibrating part and said second vibrating part for delivering lubricating fluid to said first reciprocating-type compression pump.

* * * * *